United States Patent
Foege

(10) Patent No.: US 9,404,429 B2
(45) Date of Patent: Aug. 2, 2016

(54) CONTROL SYSTEM FOR DUAL-FUEL ENGINE

(71) Applicant: Electro-Motive Diesel, Inc., Lagrange, IL (US)

(72) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 358 days.

(21) Appl. No.: 14/039,445

(22) Filed: Sep. 27, 2013

(65) Prior Publication Data
US 2015/0090221 A1    Apr. 2, 2015

(51) Int. Cl.
*F02D 19/02* (2006.01)
*F02D 19/10* (2006.01)
*F02D 19/08* (2006.01)
*F02D 41/00* (2006.01)
*F02D 41/22* (2006.01)

(52) U.S. Cl.
CPC ............ *F02D 19/10* (2013.01); *F02D 19/025* (2013.01); *F02D 19/08* (2013.01); *F02D 19/105* (2013.01); *F02D 41/0027* (2013.01); *F02D 41/221* (2013.01); *F02D 2041/225* (2013.01); *Y02T 10/36* (2013.01)

(58) Field of Classification Search
CPC ... F02D 19/023; F02D 19/025; F02D 19/026; F02D 19/029; F02D 19/105; F02D 19/027; F02D 19/0623; F02D 19/0639; F02D 19/08; F02D 41/0027; F02D 41/042; F02D 41/062; F02D 41/221; F02D 41/1497; F02D 41/3872; F02D 2041/225; F02D 35/027; F02M 21/0221; F02M 21/029; F02M 21/0293; F02B 75/22

USPC ......... 123/352, 526, 577, 578, 575, 525, 425, 123/406.4; 73/35.11, 35.19, 35.01, 35.07, 73/114.02, 114.07, 119 R; 324/537
See application file for complete search history.

(56) References Cited

U.S. PATENT DOCUMENTS

| | | | | |
|---|---|---|---|---|
| 3,783,681 A | * | 1/1974 | Hirt | F02D 17/04 73/114.02 |
| 4,408,479 A | * | 10/1983 | Asai | G01L 23/222 310/326 |
| 4,969,441 A | * | 11/1990 | Komurasaki | F02B 75/22 123/406.4 |
| 5,773,716 A | | 6/1998 | Antonioli et al. | |
| 5,960,772 A | * | 10/1999 | Tracy | G01L 23/222 123/406.4 |
| 6,044,806 A | * | 4/2000 | Brown | F02D 19/025 123/27 GE |
| 6,467,466 B1 | * | 10/2002 | Maekawa | F02D 41/0027 123/198 D |

(Continued)

*Primary Examiner* — Lindsay Low
*Assistant Examiner* — George Jin
(74) *Attorney, Agent, or Firm* — Finnegan, Henderson, Farabow, Garrett & Dunner, LLP

(57) ABSTRACT

A control system is provided for use with a dual-fuel engine. The control system may have a detonation sensor configured to generate a detonation signal indicative of detonation within at least one associated cylinder of the dual-fuel engine, and a governor sensor configured to generate a demand signal associated with a demand for liquid fuel supply into the dual-fuel engine based on an output of the engine. The control system may also have a detection sensor configured to generate a detection signal indicative of a gaseous fuel presence outside the dual-fuel engine, and a controller in communication with the detonation sensor, the governor sensor, and the detection sensor. The controller may be configured to determine undesired flow of gaseous fuel based on any one or more of the detonation, demand, or detection signals.

19 Claims, 2 Drawing Sheets

(56) References Cited

U.S. PATENT DOCUMENTS

| | | |
|---|---|---|
| 6,761,629 B1 | 7/2004 | Parker et al. |
| 6,776,026 B1 * | 8/2004 | Barron .................. G01L 23/222 73/35.11 |
| 7,315,778 B1 * | 1/2008 | Kumar ................ F02D 41/1497 123/357 |
| 7,647,156 B2 | 1/2010 | Mischler et al. |
| 7,805,985 B2 | 10/2010 | Friedl et al. |
| 7,970,528 B2 * | 6/2011 | Janarthanam .......... B60H 1/008 123/321 |
| 2004/0094134 A1 | 5/2004 | Redmond et al. |
| 2005/0205021 A1 * | 9/2005 | Shute .................... F02D 19/081 123/27 GE |
| 2010/0332104 A1 * | 12/2010 | Griese ................. F02D 19/0631 701/102 |
| 2011/0282501 A1 | 11/2011 | Martin |
| 2011/0301826 A1 * | 12/2011 | Galindo ................ F01N 3/0814 701/103 |
| 2014/0130777 A1 * | 5/2014 | Kuroki .................... F02D 41/22 123/445 |
| 2014/0338645 A1 * | 11/2014 | Ariie .................. F02D 19/0613 123/575 |

\* cited by examiner

CONTROL SYSTEM FOR DUAL-FUEL ENGINE

TECHNICAL FIELD

The present disclosure relates generally to a control system and, more particularly, to a control system for use with a dual-fuel engine.

BACKGROUND

Dual-fuel engines are well known in the art and combust a mixture of two different types of fuel. For example, a particular dual-fuel engine can combust a mixture of a liquid fuel (e.g., diesel fuel) and a gaseous fuel (e.g., natural gas). By combusting two different types of fuel, advantages of both fuels (e.g., efficiency, power, emissions, cost, etc.) can be realized.

In order to properly control performance of a dual-fuel engine, the flow of each individual fuel should be known and tightly controlled. In many applications, the engine is started with the liquid fuel and, then after a period of time, the engine transitions to operation on the gaseous fuel. If the flow of the liquid and/or gaseous fuel is unknown and/or uncontrolled, caused for example by a fuel leak, the engine may be at risk of over or under-fueling. Either situation can result in a loss of performance and/or engine damage.

Historically, fuel leakage has been detected in several different ways. For example, U.S. Pat. No. 6,044,806 that issued to Brown et al. on Apr. 4, 2000 ("the '806 patent") describes a dual-fuel engine having a leak detection system configured to check for a leaking gas admission valve in two different ways. The leak detection system includes a detonation sensor mounted to an engine block, and an electronic fuel governor. During a dual-fuel mode of operation, signals from the detonation sensor are compared to expected values. And when a significant deviation between the signals occurs, it is concluded that the gas admission valve is leaking. Similarly, a demand for liquid fuel by the governor is monitored before and after opening of the gas admission valve, and a difference in the demand is compared to an expected difference. When a significant increase in fuel demand occurs, it is again concluded that the gas admission valve is leaking. These methods can be used alone or together, as desired, to selectively control (e.g., shut off) gaseous fuel flow through the admission valve into the engine.

Although the system of the '806 patent may successfully detect gas leakage through an admission valve in a dual-fuel engine, it may still be limited. Specifically, the system may be able to detect only an internal gas leak and/or a gas leak caused by only the admission valve. Further, the location of the detonation sensor may not optimally detect detonation within every cylinder in a multi-cylinder engine.

The disclosed control system is directed to overcoming one or more of the problems set forth above.

SUMMARY

In one aspect, the present disclosure is directed to a control system for a dual-fuel engine. The control system may include a detonation sensor configured to generate a detonation signal indicative of detonation within at least one associated cylinder of the dual-fuel engine, and a governor sensor configured to generate a demand signal associated with a demand for liquid fuel supply into the dual-fuel engine based on an output of the engine. The control system may also include a detection sensor configured to generate a detection signal indicative of a gaseous fuel presence outside the dual-fuel engine, and a controller in communication with the detonation sensor, the governor sensor, and the detection sensor. The controller may be configured to determine undesired flow of gaseous fuel based on any one or more of the detonation, demand, or detection signals.

In another aspect, the present disclosure is directed to a method of controlling a dual-fuel engine. The method may include detecting detonation within at least one cylinder of the dual-fuel engine, and monitoring a demand for liquid fuel supply to the dual-fuel engine. The method may also include detecting a gaseous fuel presence external of the dual-fuel engine, and selectively determining existence of a gaseous fuel leak based on any one or more of the detonation, the demand for liquid fuel supply, and the gaseous fuel presence.

In yet another aspect, the present disclosure is directed to an engine. The engine may include an engine block forming a plurality of cylinder bores, and a plurality of cylinder liners each disposed within a corresponding one of the plurality of cylinder bores. The engine may also include a bracket configured to connect adjacent liners of the plurality of cylinder liners to the engine block, and a detonation sensor mounted within the bracket.

DETAILED DESCRIPTION

Figure 1:
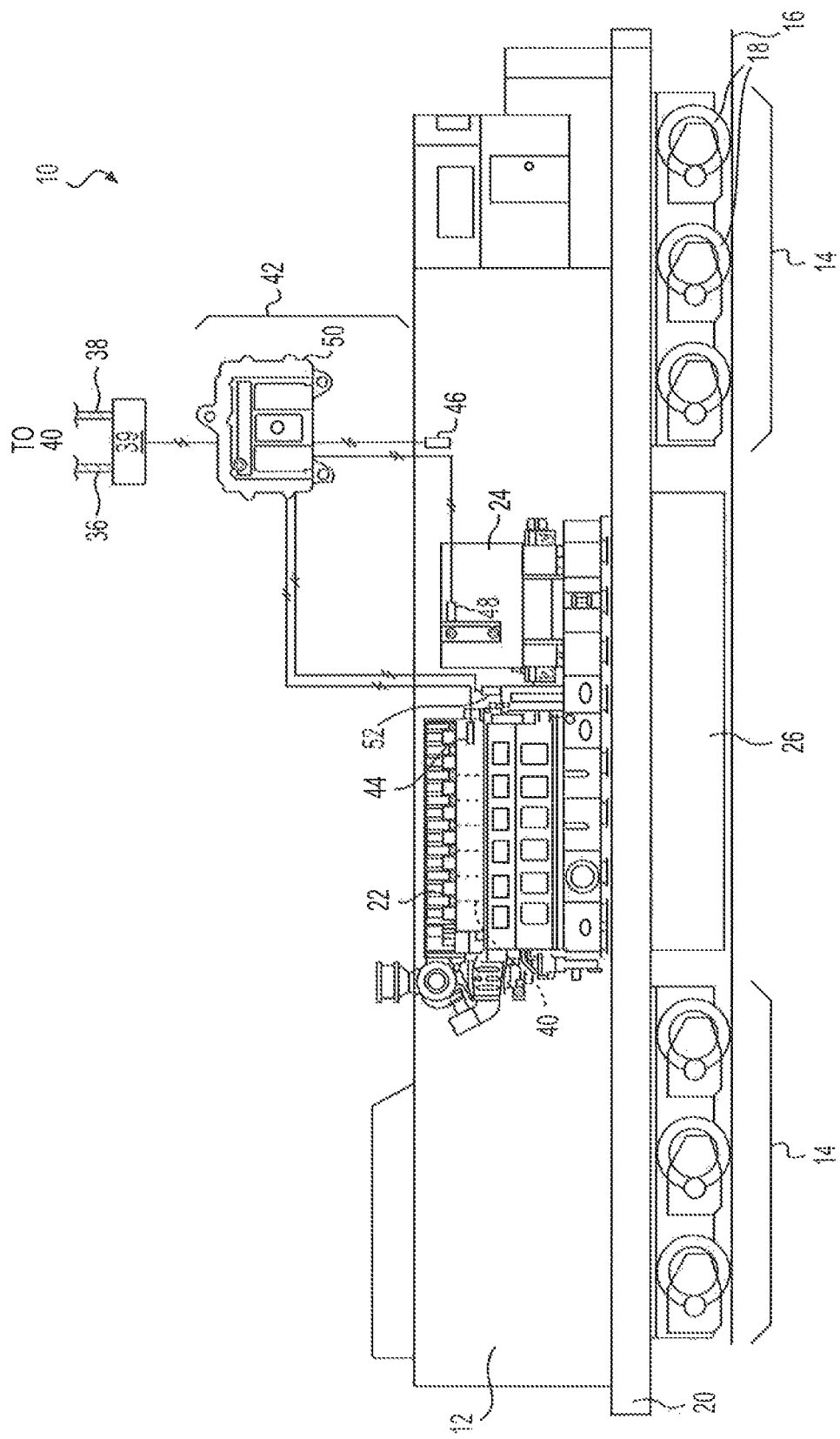
FIG. 1 is an diagrammatic illustration of an exemplary disclosed machine.

FIG. 1 illustrates an exemplary machine 10. Machine 10 may be a mobile machine that performs some type of operation associated with an industry such as transportation, farming, mining, construction, or any other industry known in the art. For example, machine 10 may be a locomotive of a train consist. As a locomotive, machine 10 may include, among other things, a car body 12 that is supported at opposing ends by a plurality of trucks 14. Each truck 14 may be configured to engage a track 16 via a plurality of wheels 18, and to support a frame 20 of car body 12. Any number of engines 22 may be mounted to frame 20, housed within car body 12, and configured to drive a generator 24 that produces electricity to drive wheels 18.

Engine 22 may be a dual-fuel engine configured to combust two different types of fuel and generate a mechanical output that drives generator 24. For example, engine 22 may be configured to combust a liquid fuel (e.g., diesel fuel) and a gaseous fuel (e.g., natural gas). The liquid fuel may be supplied to engine 22 from an onboard tank 26, while the gaseous fuel may be supplied to engine 22 from a different onboard tank and/or from a separate tender car (not shown) that is coupled to and towed by the locomotive. Engine 22 may operate in a liquid-fuel only mode, a dual-fuel mode, and/or a gaseous-fuel only mode.

Figure 2:
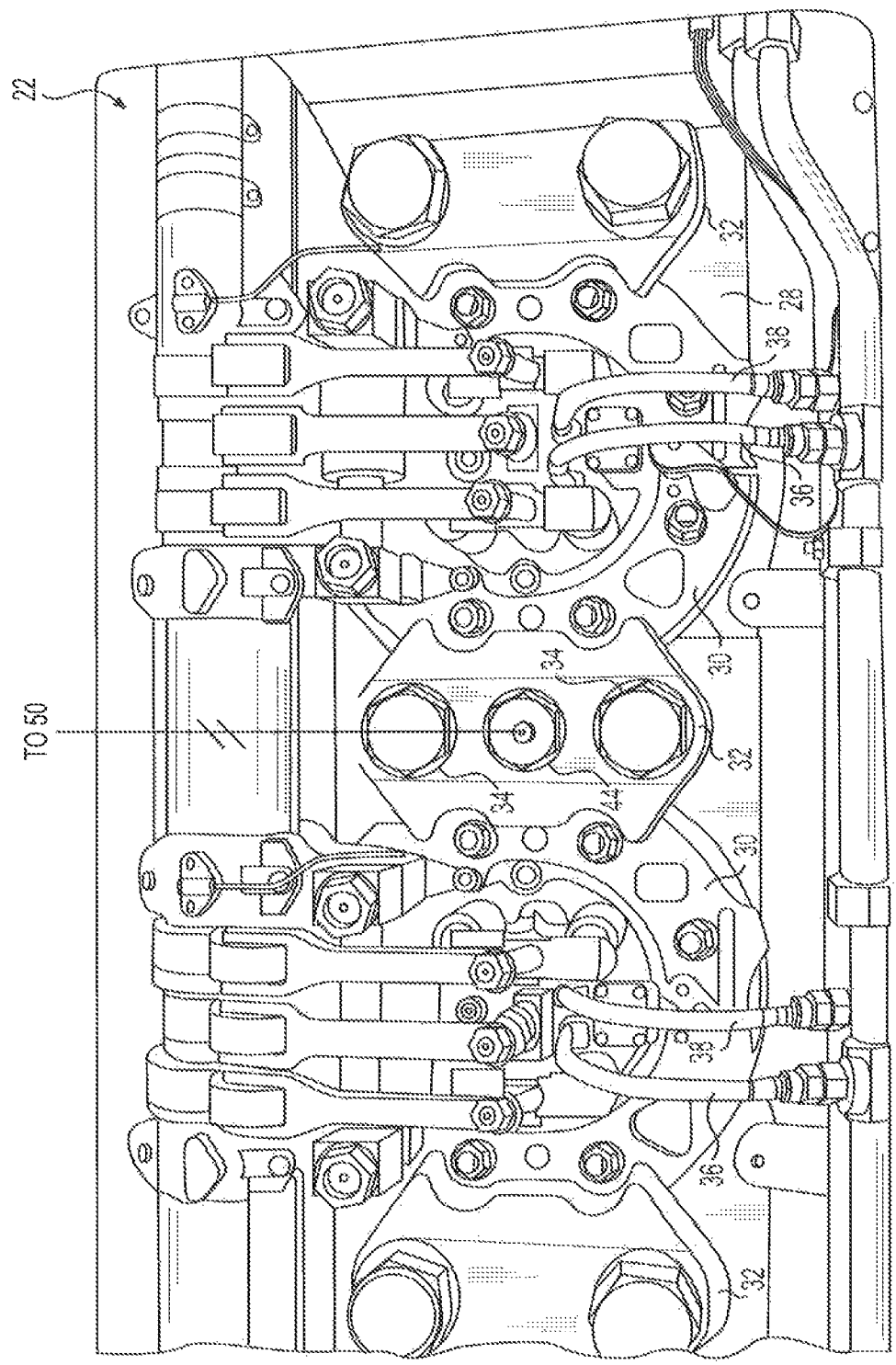
FIG. 2 is an isometric illustration of an exemplary disclosed leak detection system that may be used in conjunction with the machine of FIG. 1.

As shown in FIG. 2, engine 22 may include an engine block 28 that at least partially defines a plurality of sequentially arranged cylinder bores. A cylinder liner 30 may be disposed within each cylinder bore, and a bracket or plate 32 may be used to connect cylinder liners 30 to engine block 28. For example, one bracket 32 may be located between and overlap a lip portion of two adjacent cylinder liners 30, and one or more fasteners 34 may pass through each bracket 32 into engine block 28. In this manner, each cylinder liner 30 may be connected at two opposing sides to engine block 28 by way of two different brackets 32.

Gaseous and liquid fuel lines 36, 38 may supply fuel to a plurality of combustion chambers 40 (referring back to FIG. 1) that are at least partially defined by cylinder liners 30. For the purposes of this disclosure, engine 22 is depicted and described as having twelve combustion chambers 40 arranged into two separate banks. One skilled in the art will recognize, however, that engine 22 may include a greater or lesser number of combustion chambers 40, and that combustion chambers 40 may be disposed in an "in-line" configuration, in a "V" configuration, in an opposing piston configuration, or in any other suitable configuration. Fuel flow through lines 36, 38 may be controlled via conventional mechanisms 39 known in the art (e.g., via injectors, valves, pumps, etc.) that can be located anywhere onboard the tender car or the locomotive of machine 10, as desired.

In some situations, it may be possible for the gaseous and/or liquid fuel to flow in an undesired manner. For example, the fuel may leak internally and flow into combustion chambers 40, resulting in over-fueling of engine 22 as exhibited by generation of excess power. Alternatively or additionally, the fuel may leak externally and flow into an area surrounding engine 22 (e.g., into car body 12), possibly resulting in under-fueling of engine 22 and/or creating an undesirable atmosphere within machine 10 (e.g., within car body 12). This leaking fuel, if left unchecked, could reduce an efficiency of machine 10, cause damage to machine 10, and/or create environmental concerns. For this reason, machine 10 is provided with a control system 42 configured to detect undesired fuel flow and respond accordingly. Control system 42 may include, among other things, one or more detonation sensors 44, a detection sensor 46, a governor sensor 48, and controller 50 in communication with each of these sensors and with mechanisms 39.

Detonation sensor 44 may embody, for example, an accelerometer or other type of vibration sensor configured to generate a detonation signal indicative of the combustion process occurring within one or more corresponding combustion chambers 40. In the example shown in FIG. 2, one detonation sensor 44 is paired with two adjacent combustion chambers 40. In particular, one detonation sensor 44 may be mounted within every-other bracket 32 of a particular bank of combustion chambers 40 such that, for an engine 22 having twelve combustion chambers 40, only six detonation sensors 44 may be employed. In this configuration, each detonation sensor 44 may be responsible for detecting characteristics (e.g., pressure or shock loading) of the combustion process occurring within the two associated combustion chambers 40 and for generating corresponding detonation signals. Each detonation signal may be indexed to an angular rotation of engine 22 (e.g., to an angular rotation of a crankshaft of engine 22 measured by a conventional crank-angle sensor 52) to determine which combustion process is currently being represented by the particular signal. The detonation signals (along with the signal from crank-angle sensor 52) may be directed to controller 50 for further processing.

Detection sensor 46 may be mounted external to engine 22 (referring back to FIG. 1), for example within car body 12, and configured to detect the presence of fuel (e.g., gaseous fuel). In one embodiment, detection sensor 46 may be configured to detect natural gas, methane, propane, etc. Detection sensor 46 may generate a detection signal indicative of existence of the fuel outside of engine 22 and/or indicative of an amount (e.g., concentration) of the fuel present. The detection signal may be directed to controller 50 for further processing.

Governor sensor 48 may be configured to generate a demand signal indicative of a demand for fuel supply to engine 22. Governor sensor 48 could take many different forms. In one embodiment, governor sensor 48 is associated with an electrical output of generator 24. That is, governor sensor 48 could measure an electrical output of generator 24, compare the electrical output to a desired output, and, when a significant difference exists, generate a demand signal calling for increased or reduced fuel supply. In another embodiment, governor sensor 48 may be associated with the mechanical output of engine 22. That is, governor sensor 48 could measure a speed and/or torque output of engine 22, compare the output to a desired output, and, when a significant difference exists, generate a demand signal calling for increased or reduced fuel supply. The demand signal may be directed to controller 50 for further processing.

In yet another embodiment, governor sensor 48 may be configured to generate a signal indicative of only the electrical or mechanical output, and controller 50 may then determine the need for increased or reduced fueling based on this signal. For the purposes of this disclosure, the signal generated by governor sensor 48 in this final embodiment may still be considered the demand signal. The need for increased or reduced fueling may be represented by a command (e.g., an injection pulse width command, a valve opening command, a pump displacement command, etc.) directed to one or more of mechanisms 39.

Controller 50 may embody a single processor or multiple processors that include a means for controlling an operation of machine 10 in response to the detonation signal, the detection signal, and/or the demand signal. Numerous commercially available processors may perform the functions of controller 50. Controller 50 may include or be associated with a memory for storing data such as, for example, an operating condition, design limits, performance characteristics or specifications of engine 22 and/or generator 24; operational instructions; and corresponding control parameters of machine 10. Various other known circuits may be associated with controller 50, including power supply circuitry, signal-conditioning circuitry, solenoid driver circuitry, communication circuitry, and other appropriate circuitry. Moreover, controller 50 may be capable of communicating with other components of machine 10 (e.g., with motors, actuators, sensors, switches, etc. of car body 12, engine 22, generator 24, etc.) via either wired or wireless transmission.

INDUSTRIAL APPLICABILITY

The disclosed control system may be used with any machine where regulation over undesired fuel flow is important. The disclosed control system finds particular applicability in mobile machines such as locomotives, which are powered using both liquid and gaseous fuels. As will be described in more detail below, the disclosed control system may be configured to detect an undesired flow of fuel and selectively implement responsive maneuvers to improve machine efficiency and/or reduce machine damage.

During operation of machine 10, controller 50 may regulate fuel flow based on a desired output of engine 22 and/or generator 24. For example, when the mechanical output of engine 22 and/or the electrical output of generator 24 falls below a desired output, controller 50 may generate a command (e.g., an injector pulse width command, a valve position command, a pump displacement command, etc.) directed to mechanisms 39 calling for increased fueling of engine 22. Similarly, when the mechanical output of engine 22 and/or the electrical output of generator 24 rises above a desired output, controller 50 may selectively generate a command directed to mechanisms 39 calling for decreased fueling of engine 22. The output of engine 22 and/or generator 24 may be determined based on demand signals from governor sensor 48.

Controller 50 may also use the demand signals from governor sensor 48 to detect an undesired fuel flow. In particular, when fuel is leaking uncontrollably into engine 22, engine 22 may experience an over-fueling event where more power is being produced than is desired. And as described above, when this happens, controller 50 may regulate mechanisms 39 to reduce the fuel flow into engine 22. Controller 50 will continue to call for a reduction in fuel supply (liquid and/or gaseous supply, depending on the current mode of operation) in this situation until an associated supply rate parameter (e.g., the injection pulse width, valve position, and/or pump displacement) eventually falls below a threshold amount. The threshold amount may be set to correspond with a significant difference between the amount of power that could theoretically be produced by the controlled fuel flow and the actual amount of power currently being produced by the fuel leak. In other words, the threshold amount is an amount that no longer corresponds with the amount of power being produced by engine 22. When this happens, controller 50 may conclude that an uncontrolled amount of fuel is flowing into combustion chambers 40 of engine 22.

In addition to relying on the demand signals from governor sensor 48 (together with the supply commands directed to mechanisms 39), controller 50 may also use the detonation signals from detonation sensor 44 to detect uncontrolled fuel flow into engine 22. In particular, controller 50 may compare the detonation signals associated with each individual combustion chamber 40 to an expected range of values corresponding to the controlled flow of fuel theoretically being directed into engine 22. In other words, for a given flow of fuel into engine 22, controller 50 may expect to see particular pressures or shock loading values associated with the combustion processes occurring within each combustion chamber 40. And when one or more of combustion chambers 40 are shown, via the detonation signals, to be experiencing significantly different values (e.g., greater values), controller 50 may conclude that more fuel is flowing into those combustion chambers 40 than desired.

Not all undesired fuel flows are the result of internal fuel leaks. Accordingly, controller 50 may additionally monitor the detection signals from detection sensor 46. And when higher than expected concentrations of particular fuel constituents are detected outside of engine 22 (i.e., within car body 12), controller 50 may determine that fuel is flowing external to engine 22 in an uncontrolled manner.

Controller 50 may do several different things in response to determining that fuel is flowing in an uncontrolled manner. For example, because most fuel leaks may be associated with the flow of gaseous fuel, controller 50 may cause engine 22 to be supplied with only liquid fuel in response to determining that fuel is leaking. That is, controller 50 may regulate mechanisms 39 to shut off the flow of gaseous fuel to engine 22. In addition, controller 50 may log a fault condition and/or alert an operator of machine 10 of the condition. In most situations, controller 50 may maintain operation of engine 22 after detection of fuel leakage, such that machine 10 may be capable of reaching a service facility without significant service interruption.

When the uncontrolled Mel flow is determined by controller 50 to be an external fuel leak, controller 50 may take additional steps. In particular, controller 50 may vent the area surrounding engine 22 so as to mitigate any environmental issues. In most instances, the area surrounding engine 22 may be vented simply by maintaining operation of engine 22 for at least a minimum period of time after the gaseous fuel supply to engine 22 has been shut off. Specifically, engine 22 may draw in air from its surrounding to support the liquid fuel combustion processes occurring within combustion chambers 40. Accordingly, after the gaseous supply of fuel is shut off and while engine 22 continues to operate on liquid fuel, the air surrounding engine 22 that has gaseous fuel entrained therein may be quickly consumed by engine 22 and replaced with air not containing any gaseous fuel. In some applications, controller 50 may be required to additionally open vents (not shown) and/or activate fans (not shown) in car body 12 to adequately vent the interior of car body 12. Depending on the location of machine 10, following venting of car body 12, controller 50 may then allow engine 22 to be shut down.

The disclosed control system may have many advantages. For example, the disclosed control system may be capable of detecting and responding to both internal and external fuel leaks. In addition, the fuel leaks may be detected regardless of the cause of the leaks. Further, the location of detonation sensors 44 may allow for a reduction in the number of sensors required by the disclosed control system. And this reduction may reduce a cost and a complexity of the control system.

It will be apparent to those skilled in the art that various modifications and variations can be made to the control system of the present disclosure. Other embodiments of the control system will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A control system for a dual-fuel engine, comprising:
   a detonation sensor configured to generate a detonation signal indicative of detonation within at least one associated cylinder of the dual-fuel engine;
   a governor sensor configured to generate a demand signal associated with a demand for liquid fuel supply into the dual-fuel engine based on an output of the dual-fuel engine;
   a detection sensor configured to generate a detection signal indicative of a gaseous fuel presence outside the dual-fuel engine; and
   a controller in communication with the detonation sensor, the governor sensor, and the detection sensor, the controller being configured to determine undesired flow of gaseous fuel based on at least one of the detonation, demand, or detection signals,
   wherein the dual-fuel engine includes
     an engine block forming a plurality of cylinder bores;
     a plurality of cylinder liners, each cylinder liner of the plurality of cylinder liners being disposed within a corresponding cylinder bore of the plurality of cylinder bores; and
     a bracket configured to connect adjacent liners of the plurality of cylinder liners to the engine block, the detonation sensor being mounted within the bracket.

2. The control system of claim 1, wherein the undesired flow of gaseous fuel is associated with an internal or external leak.

3. The control system of claim 1, wherein the dual-fuel engine is connected to drive a generator, and the output of the dual-fuel engine is a torque output to the generator.

4. The control system of claim 1, wherein the dual-fuel engine is connected to drive a generator, and the output of the dual-fuel engine is an electrical output of the generator.

5. The control system of claim 1, wherein the controller further is configured to:
   make a comparison of a measured output to an expected output;
   selectively adjust a liquid fuel injection pulse width based on the comparison; and
   determine the undesired flow of gaseous fuel when the liquid fuel injection pulse width is less than a threshold pulse width.

6. The control system of claim 1, wherein the controller is further configured to selectively shut off a gaseous fuel flow to the dual-fuel engine based on the undesired flow of gaseous fuel.

7. The control system of claim 6, wherein the controller is further configured to selectively cause venting of an area surrounding the dual-fuel engine based on the detection signal.

8. The control system of claim 7, wherein the controller is further configured to selectively cause venting of the area surrounding the dual-fuel engine by maintaining operation of the dual-fuel engine for a period of time after the gaseous fuel flow has been shut off.

9. The control system of claim 7, wherein the controller is further configured to selectively alert an operator of the dual-fuel engine and log a fault condition based on the undesired flow of gaseous fuel.

10. The control system of claim 7, wherein the controller is further configured to maintain operation of the dual-fuel engine in a liquid fuel-only mode based on the undesired flow of gaseous fuel.

11. The control system of claim 1, wherein the bracket is one of a plurality of brackets connecting the plurality of cylinder liners to the engine block,
   the detonation sensor is one of a plurality of detonation sensors, and
   the controller is in communication with each detonation sensor of the plurality of detonation sensors and further configured to determine the undesired flow of gaseous fuel based on detonation signals from any detonation sensor of the plurality of detonation sensors.

12. The control system of claim 11, wherein a number of detonation sensors in the plurality of detonation sensors is less than a number of brackets in the plurality of brackets.

13. The control system of claim 12, wherein the plurality of cylinder liners are arranged sequentially in at least one bank, and
   the plurality of detonation sensors are associated with every-other bracket of the plurality of brackets used to connect the plurality of cylinder liners to the engine block within the at least one bank.

14. The control system of claim 1, wherein the controller is further configured to determine the undesired flow of gaseous fuel based on the detonation signal during any one of a liquid fuel-only mode, a dual-fuel mode, and a gaseous fuel only mode of operation.

15. A method for controlling a dual-fuel engine, the dual-fuel engine including
   an engine block forming a plurality of cylinder bores,
   a plurality of cylinder liners, each cylinder liner of the plurality of cylinder liners being disposed within a corresponding cylinder bore of the plurality of cylinder bores,
   a bracket configured to connect adjacent liners of the plurality of cylinder liners to the engine block, and
   a detonation sensor mounted within the bracket, the method comprising:
   detecting detonation within at least one cylinder of the dual-fuel engine based on a signal from the detonation sensor;
   monitoring a demand for liquid fuel supply to the dual-fuel engine;
   detecting a gaseous fuel presence external of the dual-fuel engine; and
   selectively determining existence of a gaseous fuel leak based on at least one of the detonation, the demand for liquid fuel supply, and the gaseous fuel presence.

16. The method of claim 15, wherein the monitoring the demand for liquid fuel includes making a comparison of a measured output of the dual-fuel engine to an expected output,
   the method further comprises selectively adjusting a liquid fuel injection pulse width based on the comparison, and
   the selectively determining existence of the gaseous fuel leak includes determining the existence of the gaseous fuel leak when the liquid fuel injection pulse width is less than a threshold pulse width.

17. The method of claim 15, further comprising:
   selectively shutting off gaseous fuel flow to the dual-fuel engine based on the existence of the gaseous fuel leak; and
   selectively causing venting of an area surrounding the dual-fuel engine based on the gaseous fuel presence external of the dual-fuel engine by maintaining operation of the dual-fuel engine for a period of time after the gaseous fuel flow has been shut off.

18. An engine, comprising:
   an engine block forming a plurality of cylinder bores;
   a plurality of cylinder liners, each cylinder liner of the plurality of cylinder liners being disposed within a corresponding cylinder bore of the plurality of cylinder bores;
   a bracket configured to connect adjacent liners of the plurality of cylinder liners to the engine block; and
   a detonation sensor mounted within the bracket.

19. The engine of claim 18, wherein
   the bracket is one of a plurality of brackets;
   the plurality of cylinder liners are arranged sequentially in at least one bank;
   the detonation sensor is one of a plurality of detonation sensors;
   the plurality of detonation sensors are associated with every-other bracket of the plurality of brackets used to connect the plurality of cylinder liners to the engine block within the at least one bank; and
   the engine further comprises a controller in communication with each detonation sensor of the plurality of detonation sensors and configured to selectively determine an undesired flow of gaseous fuel based on signals from any detonation sensor of the plurality of detonation sensors.

* * * * *